US010434900B2

(12) United States Patent
Hirayama et al.

(10) Patent No.: US 10,434,900 B2
(45) Date of Patent: Oct. 8, 2019

(54) VEHICLE CONTROL SYSTEM, VEHICLE CONTROL METHOD, AND RECORDING MEDIUM

(71) Applicant: HONDA MOTOR CO., LTD., Minato-ku, Tokyo (JP)

(72) Inventors: Kenta Hirayama, Shioya-gun (JP); Hajime Ishihara, Utsunomiya (JP); Manabu Matsumoto, Utsunomiya (JP); Muneatsu Minato, Utsunomiya (JP); Yosuke Nishimura, Sakura (JP)

(73) Assignee: HONDA MOTOR CO., LTD., Tokyo (JP)

( * ) Notice: Subject to any disclaimer, the term of this patent is extended or adjusted under 35 U.S.C. 154(b) by 103 days.

(21) Appl. No.: 15/866,608

(22) Filed: Jan. 10, 2018

(65) Prior Publication Data

US 2018/0208080 A1 Jul. 26, 2018

(30) Foreign Application Priority Data

Jan. 20, 2017 (JP) ................................. 2017-008534

(51) Int. Cl.
*B60N 2/02* (2006.01)
*B60N 2/90* (2018.01)
*B60N 2/66* (2006.01)

(52) U.S. Cl.
CPC ........... *B60N 2/0224* (2013.01); *B60N 2/665* (2015.04); *B60N 2/914* (2018.02); *B60N 2002/026* (2013.01); *B60N 2002/0268* (2013.01)

(58) Field of Classification Search
CPC ...... B60N 2/0224; B60N 2/665; B60N 2/914; B60N 2002/026; B60N 2002/0268
See application file for complete search history.

(56) References Cited

U.S. PATENT DOCUMENTS

| 2003/0023363 A1* | 1/2003 | Katz .................... | B60N 2/0244 |
| | | | 701/49 |
| 2008/0133092 A1* | 6/2008 | Hozumi .............. | B60N 2/0244 |
| | | | 701/49 |

(Continued)

FOREIGN PATENT DOCUMENTS

| JP | 2017-065343 | 4/2017 |
| JP | 2018-070075 | 5/2018 |
| WO | 2013180089 | 12/2013 |

OTHER PUBLICATIONS

Japanese Notice of Allowance for Japanese Patent Application No. 2017-008534 dated Jan. 22, 2019.

*Primary Examiner* — Ruth Ilan
(74) *Attorney, Agent, or Firm* — Amin, Turocy & Watson LLP

(57) ABSTRACT

A vehicle control system includes a seat (41) on which an occupant of a vehicle sits, a first protruding mechanism (45) configured to move a pushing member (45A) provided inside the seat to adjust a protruding position and a displacement of the seat, a second protruding mechanism (46) configured to inject a gas or liquid into a bag-like member (46B) provided inside the seat to adjust the protruding position and the displacement of the seat, and a seat control unit configured to control the first protruding mechanism to cause at least a part of a contact portion between the occupant and the seat to protrude in a case that the vehicle performs a first driving mode having a degree of automated driving less than a predetermined reference and to control the second protruding mechanism to cause at least a part of the contact portion between the occupant and the seat to protrude in a case that the vehicle performs a second driving mode having a degree of automated driving equal to or higher than the predetermined reference.

9 Claims, 10 Drawing Sheets

(56) References Cited

U.S. PATENT DOCUMENTS

| | | | | |
|---|---|---|---|---|
| 2017/0101032 A1* | 4/2017 | Sugioka | ................ | B60N 2/763 |
| 2017/0341648 A1* | 11/2017 | Sanma | ................ | B60N 3/06 |
| 2018/0170230 A1* | 6/2018 | Onuma | ................ | F04B 45/067 |
| 2018/0229740 A1* | 8/2018 | Matsumoto | ........ | G06K 9/00369 |
| 2018/0281623 A1* | 10/2018 | Matsumoto | ......... | B60N 2/0244 |
| 2018/0290563 A1* | 10/2018 | Minato | ............... | B60N 2/0727 |
| 2018/0292821 A1* | 10/2018 | Minato | ............... | G05D 1/0061 |
| 2018/0304774 A1* | 10/2018 | Mizoi | ................ | B60N 2/976 |

\* cited by examiner

VEHICLE CONTROL SYSTEM, VEHICLE CONTROL METHOD, AND RECORDING MEDIUM

CROSS-REFERENCE TO RELATED APPLICATION

Priority is claimed on Japanese Patent Application No. 2017-008534, filed Jan. 20, 2017, the content of which is incorporated herein by reference.

BACKGROUND OF THE INVENTION

Field of the Invention

The present invention relates to a vehicle control system, a vehicle control method, and a recording medium.

Description of Related Art

Recently, technologies for controlling the position of a seat on which an occupant sits in a vehicle on the basis of the travel state of the vehicle have been under research. In connection with this, a seat device having a movable mechanism which can form a protrusion portion extending in parallel with the spinal column of an occupant sitting on the seat device at a position associated with the spinal column of the occupant in a case that automatic driving reliably ensures a suitable driving state during travel of the vehicle has been disclosed (see, for example, PCT international Publication No. 2013/180089).

SUMMARY OF THE INVENTION

However, such technologies of the related art are not enough to provide the effect of relaxing the occupant or maintaining the posture of the occupant suitable for driving according to changes in the driving mode.

Aspects of the present invention have been made in view of the above circumstances and it is an object of the present invention to provide a vehicle control system, a vehicle control method, and a recording medium which can realize seat forms more suitable for changes in the driving mode.

The vehicle control system, the vehicle control method, and the recording medium according to the present invention employ the following configurations.

(1) A vehicle control system according to an aspect of the present invention includes a seat on which an occupant of a vehicle sits, a first protruding mechanism configured to move a pushing member provided inside the seat to adjust a protruding position and a displacement of the seat, a second protruding mechanism configured to inject a gas or liquid into a bag-like member provided inside the seat to adjust the protruding position and the displacement of the seat, and a seat control unit configured to control the first protruding mechanism to cause at least a part of a contact portion between the occupant and the seat to protrude in a case that the vehicle performs a first driving mode having a degree of automated driving less than a predetermined reference and to control the second protruding mechanism to cause at least a part of the contact portion between the occupant and the seat to protrude in a case that the vehicle performs a second driving mode having a degree of automated driving equal to or higher than the predetermined reference.

(2) In the above aspect (1), in a case that the first protruding mechanism is actuated, the seat control unit is configured to make it more difficult for the occupant sitting on the seat to swing than in a case that the second protruding mechanism is actuated.

(3) In the above aspect (1), in a case that the vehicle switches from the second driving mode to the first driving mode, the seat control unit is configured to control the second protruding mechanism such that the bag-like member discharges the gas or liquid and to control the first protruding mechanism such that the first protruding mechanism supports a posture of the occupant.

(4) In the above aspect (1), the bag-like member is formed of an elastic body and expands when the gas or liquid is injected and discharges the gas or liquid by an elastic force of returning to an original shape.

(5) In the above aspect (1), the seat control unit is configured to control the first protruding mechanism such that the first protruding mechanism moves the pushing member to a reference position in a case that the vehicle switches from the first driving mode to the second driving mode and then to control the second protruding mechanism to cause at least a part of the contact portion between the occupant and the seat to protrude.

(6) In the above aspect (1), a plurality of bag-like members for storing the gas or liquid are provided inside the seat, and the seat control unit is configured to control the second protruding mechanism such that the gas or liquid is injected into one of the plurality of bag-like members associated with a part of the occupant which is in contact with the seat.

(7) In the above aspect (6), the seat control unit is configured to control the second protruding mechanism such that the second protruding mechanism adjusts at least one of an amount of injection, an amount of discharge, an injection speed, or a discharge speed of the gas or liquid of each of the plurality of bag-like members.

(8) A vehicle control method using an in-vehicle computer, according to an aspect of the present invention includes controlling a first protruding mechanism configured to move a pushing member provided in a seat on which an occupant of a vehicle sits to adjust a protruding position and a displacement of the seat in a case that the vehicle performs a first driving mode having a degree of automated driving less than a predetermined reference, and controlling a second protruding mechanism configured to inject a gas or liquid into a bag-like member provided in the seat to adjust the protruding position and the displacement of the seat in a case that the vehicle performs a second driving mode having a degree of automated driving equal to or higher than the predetermined reference.

(9) A non-transitory computer-readable recording medium according to an aspect of the present invention records a vehicle control program causing an in-vehicle computer to control a first protruding mechanism configured to move a pushing member provided in a seat on which an occupant of a vehicle sits to adjust a protruding position and a displacement of the seat in a case that the vehicle performs a first driving mode having a degree of automated driving less than a predetermined reference, and to control a second protruding mechanism configured to inject a gas or liquid into a bag-like member provided in the seat to adjust the protruding position and the displacement of the seat in a case that the vehicle performs a second driving mode having a degree of automated driving equal to or higher than the predetermined reference.

According to the above aspects (1), (8), and (9), it is possible to realize seat forms more suitable for changes in the driving mode.

According to the above aspect (2), even if the first protruding mechanism is actuated, it is possible not to disturb the driving posture of the occupant in the first driving mode.

According to the above aspect (3), it is possible to promptly return to a seat position at which the seat was located when performing the first driving mode having the degree of automated driving less than the predetermined reference.

According to the above aspect (4), it is possible to easily cause the seat to protrude using a gas or liquid. According to the above aspect (4), it is also possible to promptly discharge the gas or liquid by elasticity of the bag-like member.

According to the above aspect (5), it is possible to increase a displacement between the maximum protrusion and the maximum depression using a gas or liquid.

According to the above aspect (6) or (7), it is possible to more flexibly adjust the mode of causing the seat to protrude and therefore it is possible to further improve the massage or relaxation effect.

DETAILED DESCRIPTION OF THE INVENTION

Hereinafter, embodiments of a vehicle control system, a vehicle control method, and a recording medium according to a first embodiment will be described with reference to the drawings. In the embodiments, it is assumed that the vehicle control system is applied to an automated driving vehicle. Here, automated driving has degrees. The degree of automated driving can be determined, for example, such that it is less than a predetermined reference or is equal to or higher than the predetermined reference. The degree of automated driving less than the predetermined reference indicates, for example, the case in which manual driving is being performed or the case in which only driving support devices such as an adaptive cruise control (ACC) system or a lane keeping assistance system (LKAS) are running. The driving mode in which the degree of automated driving is less than the predetermined reference is an example of a "first driving mode." The degree of automated driving equal to or higher than the predetermined reference indicates, for example, the case in which driving support devices such as an auto lane changing (ALC) device and a low speed car passing (LSP) device having a higher degree of control than the ACC or LKAS are running or the case in which automated driving for automatically performing lane change, merging, and branching is being performed. The driving mode in which the degree of automated driving is equal to or higher than the predetermined reference is an example of a "second driving mode." The predetermined reference can be arbitrarily set. In the embodiments, it is assumed that the first driving mode is manual driving and the second driving mode is automated driving.

First Embodiment

[Overall Configuration]

Figure 1:
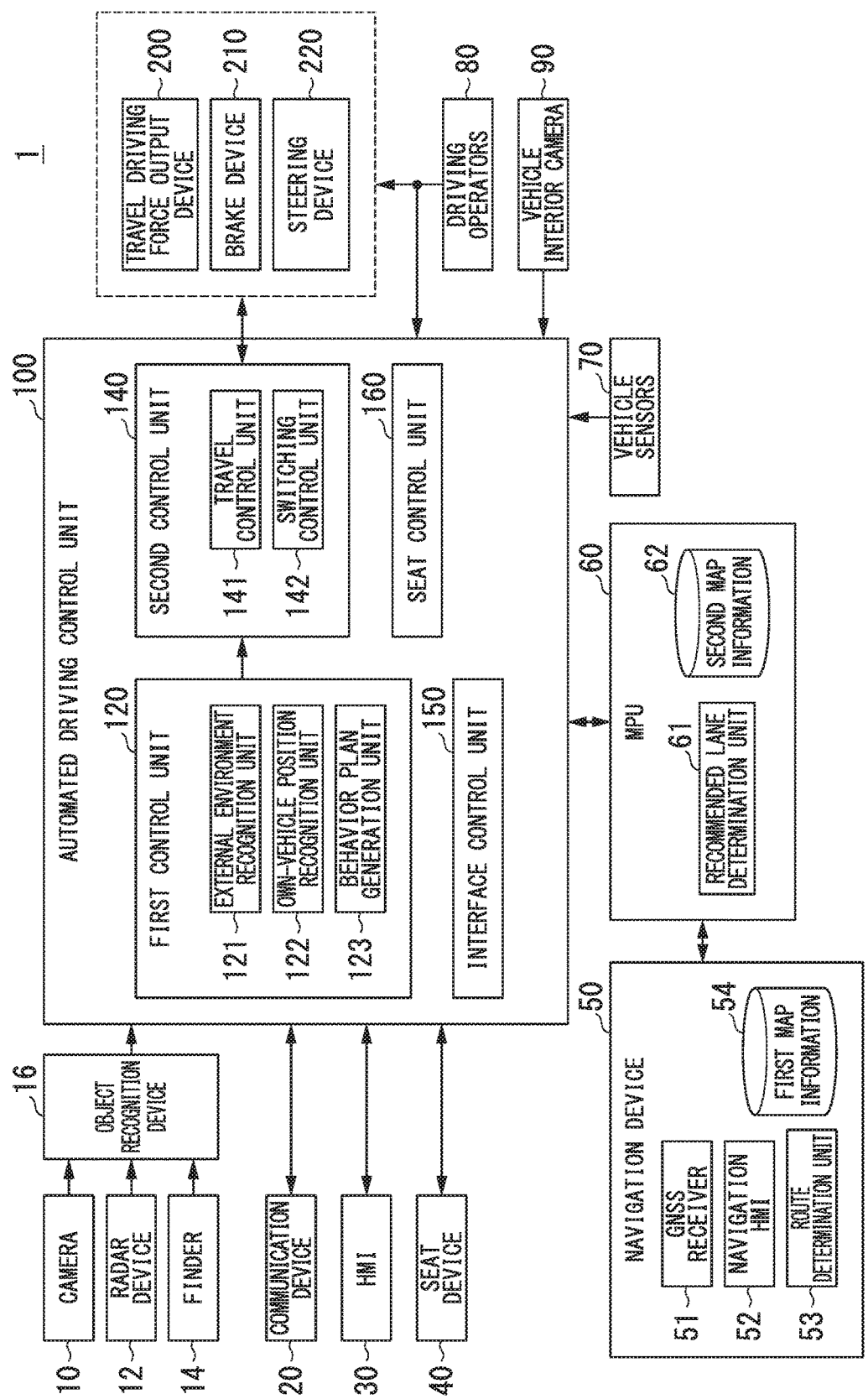
FIG. 1 is a configuration diagram of a vehicle system according to a first embodiment.

FIG. 1 is a configuration diagram of a vehicle system 1 according to the first embodiment. A vehicle in which the vehicle system 1 is mounted (hereinafter referred to as a vehicle M) is, for example, a vehicle such as a two-wheeled vehicle, a three-wheeled vehicle, or a four-wheeled vehicle, and a driving source thereof is an internal combustion engine such as a diesel engine or a gasoline engine, an electric motor, or a combination thereof. The electric motor operates using electric power generated by a generator connected to the internal combustion engine or using discharge power of a secondary battery or a fuel cell.

The vehicle system 1 includes, for example, a camera 10, a radar device 12, a finder 14, an object recognition device 16, a communication device 20, a human machine interface (HMI) 30, a seat device 40, a navigation device 50, a micro-processing unit (MPU) 60, vehicle sensors 70, driving operators 80, a vehicle interior camera 90, an automated driving control unit 100, a travel driving force output device 200, a brake device 210, and a steering device 220. These devices or apparatuses are connected to each other by a multiplex communication line or a serial communication line such as a controller area network (CAN) communication line, a wireless communication network, or the like. The components shown in FIG. 1 are merely an example and some of the components may be omitted or other components may be added.

In the first embodiment, the "vehicle control system" includes, for example, the seat device 40 and the automated driving control unit 100.

The camera 10 is, for example, a digital camera using a solid-state imaging device such as a charge coupled device (CCD) or complementary metal oxide semiconductor (CMOS) image sensor. One or a plurality of cameras 10 may be attached to the vehicle M, in which the vehicle system 1 is mounted, at arbitrary locations. For imaging the area in front of the vehicle, a camera 10 is attached to an upper portion of a front windshield, a rear surface of a rearview mirror, or the like. For imaging the area behind the vehicle, a camera 10 is attached to an upper portion of a rear windshield, a back door, or the like. For imaging the area to the side of the vehicle, a camera 10 is attached to a door mirror or the like. For example, the camera 10 repeats imaging of the surroundings of the vehicle M at regular intervals. The camera 10 may also be a stereo camera.

The radar device 12 radiates radio waves such as millimeter waves around the vehicle M and detects radio waves reflected by an object (reflected waves) to detect at least the position (distance and orientation) of the object. One or a plurality of radar devices 12 may be attached to the vehicle M at arbitrary locations. The radar device 12 may detect the position and velocity of an object using a frequency modulated continuous wave (FMCW) method.

The finder 14 is a light detection and ranging or laser imaging detection and ranging (LIDAR) finder which measures scattered light from an object in response to illuminated light to detect the distance to the object. One or a plurality of finders 14 may be attached to the vehicle M at arbitrary locations.

The object recognition device 16 performs a sensor fusion process on results of detection by some or all of the camera 10, the radar device 12, and the finder 14 to recognize the position, type, speed, or the like of the object. The object recognition device 16 outputs the recognition result to the automated driving control unit 100.

For example, the communication device 20 communicates with other vehicles near the vehicle M using a cellular network, a Wi-Fi network, Bluetooth (registered trademark), dedicated short range communication (DSRC) or the like or communicates with various server devices via wireless base stations. The communication device 20 also communicates with a terminal device held by a person outside the vehicle.

The HMI 30 presents various types of information to an occupant in the vehicle and receives an input operation from the occupant. The HMI 30 includes, for example, any of various display devices, a speaker, a buzzer, a touch panel, any of various operating switches, a key, or the like.

The seat device 40 includes seats on which occupants of the own-vehicle M sit and which are electrically drivable. The seat device 40 includes a driver's seat on which the driver sits to drive the own-vehicle M manually using the driving operators 80, a front occupant seat alongside the driver's seat, rear seats behind the driver's seat and the front occupant seat, etc. In the following description, it is assumed that the "seat device 40" is the driver's seat. The seat device 40 is actuated under control of the seat control unit 160 which will be described later. A detailed configuration of the seat device 40 will be described later.

The navigation device 50 includes, for example, a global navigation satellite system (GNSS) receiver 51, a navigation HMI 52, and a route determination unit 53 and holds first map information 54 in a storage device such as a hard disk drive (HDD) or a flash memory. The GNSS receiver specifies the position of the vehicle M on the basis of signals received from GNSS satellites. The position of the vehicle M may also be specified or supplemented by an inertial navigation system (INS) using the output of the vehicle sensors 70. The navigation HMI 52 includes a display device, a speaker, a touch panel, a key, or the like. The navigation HMI 52 may be partly or wholly shared with the HMI 30 described above. For example, the route determination unit 53 determines a route from the position of the vehicle M specified by the GNSS receiver 51 (or an arbitrary input position) to a destination input by the occupant using the navigation HMI 52 (for example, a route including information regarding waypoints on the route of travel to the destination) by referring to the first map information 54. The first map information 54 is, for example, information representing shapes of roads by links indicating roads and nodes connected by the links. The first map information 54 may include curvatures of roads, point of interest (POI) information, or the like. The route determined by the route determination unit 53 is output to the MPU 60. The navigation device 50 may also perform route guidance using the navigation HMI 52 on the basis of the route determined by the route determination unit 53. The navigation device 50 may be realized, for example, by a function of a terminal device such as a smartphone or a tablet possessed by the user. The navigation device 50 may also transmit the current position and the destination to a navigation server via the communication device 20 and acquire a route returned from the navigation server.

The MPU 60 functions, for example, as a recommended lane determination unit 61 and holds the second map information 62 in a storage device such as an HDD or a flash memory. The recommended lane determination unit 61 divides the route provided from the navigation device 50 into a plurality of blocks (for example, into blocks each 100 meters long in the direction in which the vehicle travels) and determines a recommended lane for each block by referring to the second map information 62. The recommended lane determination unit 61 determines the recommended lane such that the recommended lane is given a position in a lane order counted from the leftmost lane. When there is a branch point, a merge point, or the like on the route, the recommended lane determination unit 61 determines a recommended lane such that the vehicle M can travel on a reasonable travel route for proceeding to the branch destination.

The second map information 62 is map information with higher accuracy than the first map information 54. The second map information 62 includes, for example, information of the centers of lanes or information of the boundaries of lanes. The second map information 62 may also include road information, traffic regulation information, address information (addresses/postal codes), facility information, telephone number information, or the like. The road information includes information indicating the types of roads such as expressways, toll roads, national roads, or prefectural roads or information such as the number of lanes of each road, regions of emergency parking zones, the widths of lanes, the gradients of roads, the positions of roads (three-dimensional coordinates including longitude, latitude and height), the curvatures of curves of lanes, the positions of merge or branch points of lanes, signs installed on roads, or the like. The second map information 62 may be updated as needed by accessing another device using the communication device 20.

The vehicle sensors 70 include a vehicle speed sensor that detects the speed of the vehicle M, an acceleration sensor that detects the acceleration thereof, a yaw rate sensor that detects an angular speed thereof about the vertical axis, an orientation sensor that detects the orientation of the vehicle M, or the like.

The driving operators 80 include, for example, an accelerator pedal, a brake pedal, a shift lever, a steering wheel, and other operators. A sensor for detecting the amount of operation or the presence or absence of operation is attached to each of the driving operators 80 and detection results thereof are output to either or both of the automated driving control unit 100 or the travel driving force output, brake, and steering devices 200, 210, and 220.

The vehicle interior camera 90 captures an image of, for example, the upper body around the face of an occupant sitting on the seat device 40. The vehicle interior camera 90 captures an image of the occupant, for example, at regular intervals. The captured image of the vehicle interior camera 90 is output to the automated driving control unit 100.

[Automated Driving Control Unit]

The automated driving control unit 100 includes, for example, a first control unit 120, a second control unit 140, an interface control unit 150, and a seat control unit 160. Each of the first control unit 120, the second control unit 140, the interface control unit 150, and the seat control unit 160 is realized by a processor such as a central processing unit (CPU) executing a program (software). Some or all of the respective functional units of the first control unit 120, the second control unit 140, the interface control unit 150, and the seat control unit 160 which will be described below may be realized by hardware such as a large scale integration (LSI), an application specific integrated circuit (ASIC), or a field-programmable gate array (FPGA) or may be realized by cooperation of hardware and software. The program may be stored in a storage device such as a hard disk drive (HDD) or a flash memory in advance or may be stored in a detachable storage medium such as a DVD or a CD-ROM and then installed on the storage device by inserting the storage medium into a drive device.

The first control unit 120 includes, for example, an external environment recognition unit 121, an own-vehicle position recognition unit 122, and a behavior plan generation unit 123.

The external environment recognition unit 121 recognizes states of a nearby vehicle(s) such as the position, speed and acceleration thereof on the basis of information input from the camera 10, the radar device 12, and the finder 14 via the object recognition device 16. The position of the nearby vehicle may be represented by a representative point such as a center of gravity or a corner of the nearby vehicle or may be represented by a region expressed by a contour of the nearby vehicle. The "states" of the nearby vehicle may include acceleration or jerk of the nearby vehicle or a "behavior state" (for example, whether or not the nearby vehicle is changing or is going to change lanes).

The external environment recognition unit 121 may also recognize the positions of guardrails or utility poles, parked vehicles, people such as pedestrians, and other objects in addition to nearby vehicles.

The own-vehicle position recognition unit 122 recognizes, for example, a (traveling) lane in which the vehicle M is traveling and the relative position and attitude of the vehicle M with respect to the traveling lane. The own-vehicle position recognition unit 122 recognizes the traveling lane, for example, by comparing a pattern of road lane lines (for example, an arrangement of solid and broken lines) obtained from the second map information 62 with a pattern of road lane lines near the vehicle M recognized from an image captured by the camera 10. This recognition may be performed taking into consideration a position of the vehicle M acquired from the navigation device 50 or a result of processing by the INS.

Figure 2:
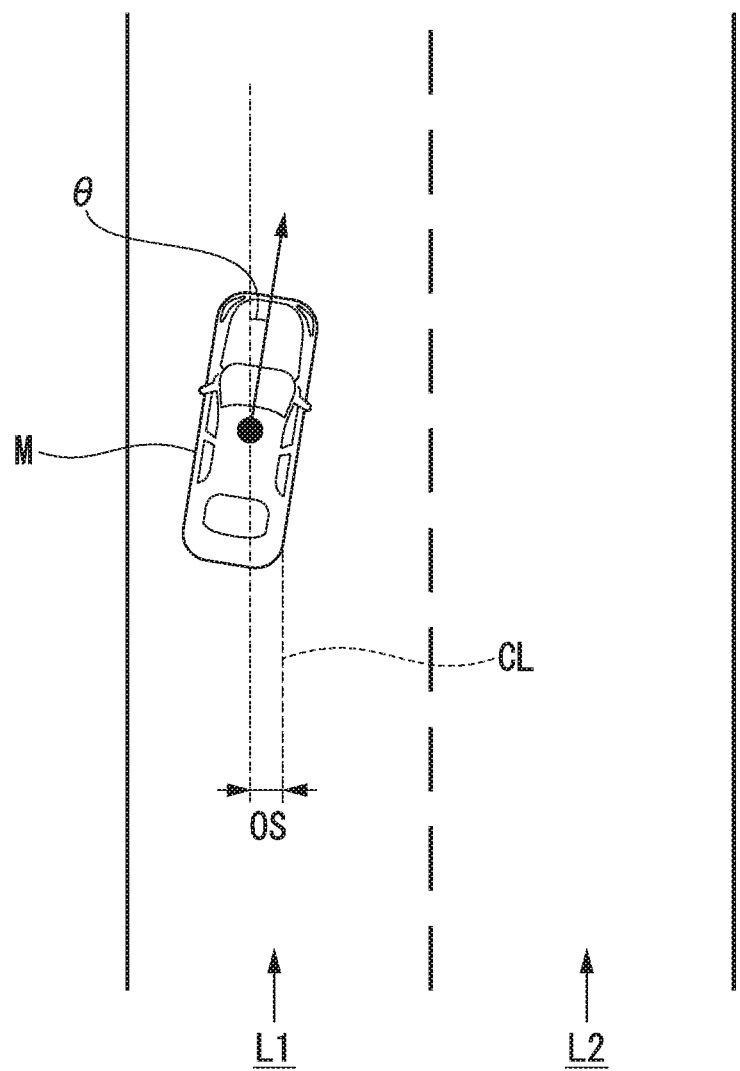
FIG. 2 is a diagram showing how the relative position and attitude of a vehicle M with respect to a traveling lane are recognized by an own-vehicle position recognition unit.

Then, the own-vehicle position recognition unit 122 recognizes, for example, the relative position or attitude of the vehicle M with respect to the traveling lane. FIG. 2 is a diagram showing how the relative position and attitude of the vehicle M with respect to the traveling lane L1 are recognized by the own-vehicle position recognition unit 122. For example, the own-vehicle position recognition unit 122 recognizes both a deviation OS from a traveling lane center CL of a reference point (for example, the center of gravity) of the vehicle M and an angle θ formed by the travel direction of the vehicle M relative to an extension line of the traveling lane center CL as the relative position and attitude of the vehicle M with respect to the traveling lane L1. Alternatively, the own-vehicle position recognition unit 122 may recognize, for example, the position of the reference point of the vehicle M with respect to one of the sides of the traveling lane L1 or the like as the relative position of the vehicle M with respect to the traveling lane. The relative position of the vehicle M recognized by the own-vehicle position recognition unit 122 is provided to the recommended lane determination unit 61 and the behavior plan generation unit 123.

The behavior plan generation unit 123 generates a behavior plan for the vehicle M to perform automated driving to the destination or the like. For example, the behavior plan generation unit 123 determines events which are to be sequentially performed in the automated driving control such that the vehicle M travels in the recommended lane determined by the recommended lane determination unit 61 and copes with situations occurring near the vehicle M. Events in the automated driving of the first embodiment include, for example, a constant-speed travel event which is an event of traveling in the same traveling lane at a constant speed, a lane change event which is an event of changing the traveling lane of the vehicle M, an overtaking event which is an event of overtaking a preceding vehicle, a following travel event which is an event of traveling behind a preceding vehicle, a merging event that is an event of causing the vehicle to merge at a merge point, a branching event which is an event of causing the vehicle M to travel in a target direction at a branch point of the road, an emergency stop event which is an event of causing the vehicle M to make an emergency stop, and a handover event which is an event of terminating automated driving and switching to manual driving. During execution of these events, behaviors for avoidance may sometimes be planned on the basis of situations occurring near the vehicle M (such as the presence of nearby vehicles and pedestrians or lane narrowing due to road construction).

The behavior plan generation unit 123 generates a target trajectory along which the vehicle M will travel in the future. The target trajectory includes, for example, velocity components. For example, the target trajectory is generated as a set of target points (trajectory points) to be reached at a plurality of future reference times which are set at intervals of a predetermined sampling time (for example, about tenths of a second). Therefore, in a case that the distance between trajectory points is great, this means that the vehicle travels at a high speed in the section between the trajectory points.

Figure 3:
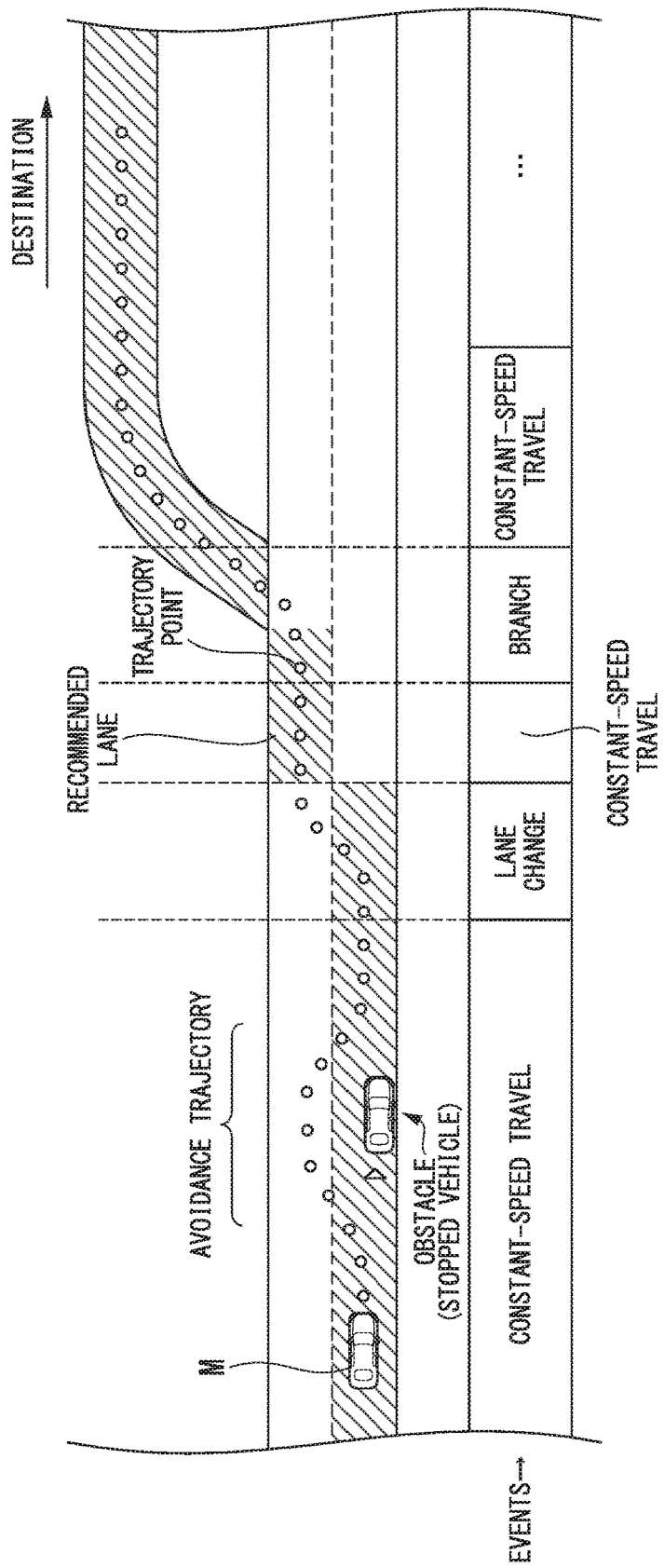
FIG. 3 is a diagram showing how a target trajectory is generated on the basis of a recommended lane.

FIG. 3 is a diagram showing how a target trajectory is generated on the basis of a recommended lane. As shown, the recommended lane is set to be convenient for traveling along the route to the destination.

In a case that the vehicle M approaches a predetermined distance (which may be determined according to the types of events) before a point for switching to the recommended lane, the behavior plan generation unit 123 activates a lane change event, a branching event, a merging event, or the like. In a case that it becomes necessary to avoid an obstacle during execution of each event, an avoidance trajectory is generated as shown in FIG. 3.

For example, the behavior plan generation unit 123 generates a plurality of candidate target trajectories and selects an optimum target trajectory that is suitable for the route to the destination at that point in view of safety and efficiency.

The second control unit 140 includes, for example, a travel control unit 141 and a switching control unit 142. The travel control unit 141 controls the travel driving force output device 200, the brake device 210, and the steering device 220 such that the vehicle M passes through the target trajectory generated by the behavior plan generation unit 123 at scheduled times.

The switching control unit 142 switches the driving mode of the vehicle M on the basis of the behavior plan generated by the behavior plan generation unit 123. For example, the switching control unit 142 switches the driving mode from manual driving to automated driving at a planned start point of the automated driving. The switching control unit 142 switches the driving mode from automated driving to manual driving at a planned end point of the automated driving.

The switching control unit 142 may switch between automated driving and manual driving, for example, on the basis of a switching signal input through an automated driving changeover switch included in the HMI 30. The switching control unit 142 may also switch the driving mode of the vehicle M from automated driving to manual driving, for example, on the basis of an operation performed on a driving operator 80 such as the accelerator pedal, the brake pedal, or the steering wheel to instruct that acceleration, deceleration, or steering be performed.

During manual driving, input information from the driving operators 80 is directly output to the travel driving force output device 200, the brake device 210, and the steering device 220. Input information from the driving operators 80 may also be output to the travel driving force output device 200, the brake device 210, and the steering device 220 via the automated driving control unit 100. Respective electronic control units (ECUs) of the travel driving force output device 200, the brake device 210, and the steering device 220 perform their operations on the basis of the input information from the driving operators 80 or the like.

The interface control unit 150 causes the HMI 30 to output a traveling state of the vehicle M during automated driving or manual driving, the timing of switching between automated driving and manual driving, a notification regarding a request for the occupant to perform manual driving or the like, etc. The interface control unit 150 may cause the HMI 30 to output information regarding control by the seat control unit 160. The interface control unit 150 may also output information received by the HMI 30 to the first control unit 120 or the seat control unit 160.

The seat control unit 160 controls the seat device 40, for example, on the basis of the information received by the HMI 30 and also controls the seat device 40 when the driving mode is switched by the switching control unit 142 as will be described later.

The travel driving force output device 200 outputs a travel driving force (torque) required for the vehicle to travel to driving wheels. The travel driving force output device 200 includes, for example, a combination of an internal combustion engine, an electric motor, a transmission, and the like and an ECU that controls them. The ECU controls the above constituent elements according to information input from the travel control unit 141 or information input from the driving operators 80.

The brake device 210 includes, for example, a brake caliper, a cylinder that transmits hydraulic pressure to the brake caliper, an electric motor that generates hydraulic pressure in the cylinder, and a brake ECU. The brake ECU controls the electric motor according to information input from the travel control unit 141 or information input from the driving operators 80 such that a brake torque in response to a braking operation is output to each wheel. The brake device 210 may include, as a backup, a mechanism for transferring a hydraulic pressure generated by an operation of the brake pedal included in the driving operators 80 to the cylinder via a master cylinder. The brake device 210 is not limited to that configured as described above and may be an electronically controlled hydraulic brake device that controls an actuator according to information input from the travel control unit 141 or information input from the driving operators 80 and transmits the hydraulic pressure of the master cylinder to the cylinder. The brake device 210 may also include a plurality of brake systems in consideration of safety.

The steering device 220 includes, for example, a steering ECU and an electric motor. The electric motor, for example, applies a force to a rack-and-pinion mechanism to change the direction of steering wheels. The steering ECU drives the electric motor according to information input from the travel control unit 141 or information input from the driving operators 80 to change the direction of the steering wheels.

[Configuration and Control of Seat Device 40]

Hereinafter, the configuration of the seat device 40 of a first embodiment and control of the seat device 40 by the seat control unit 160 will be described.

Figure 4:
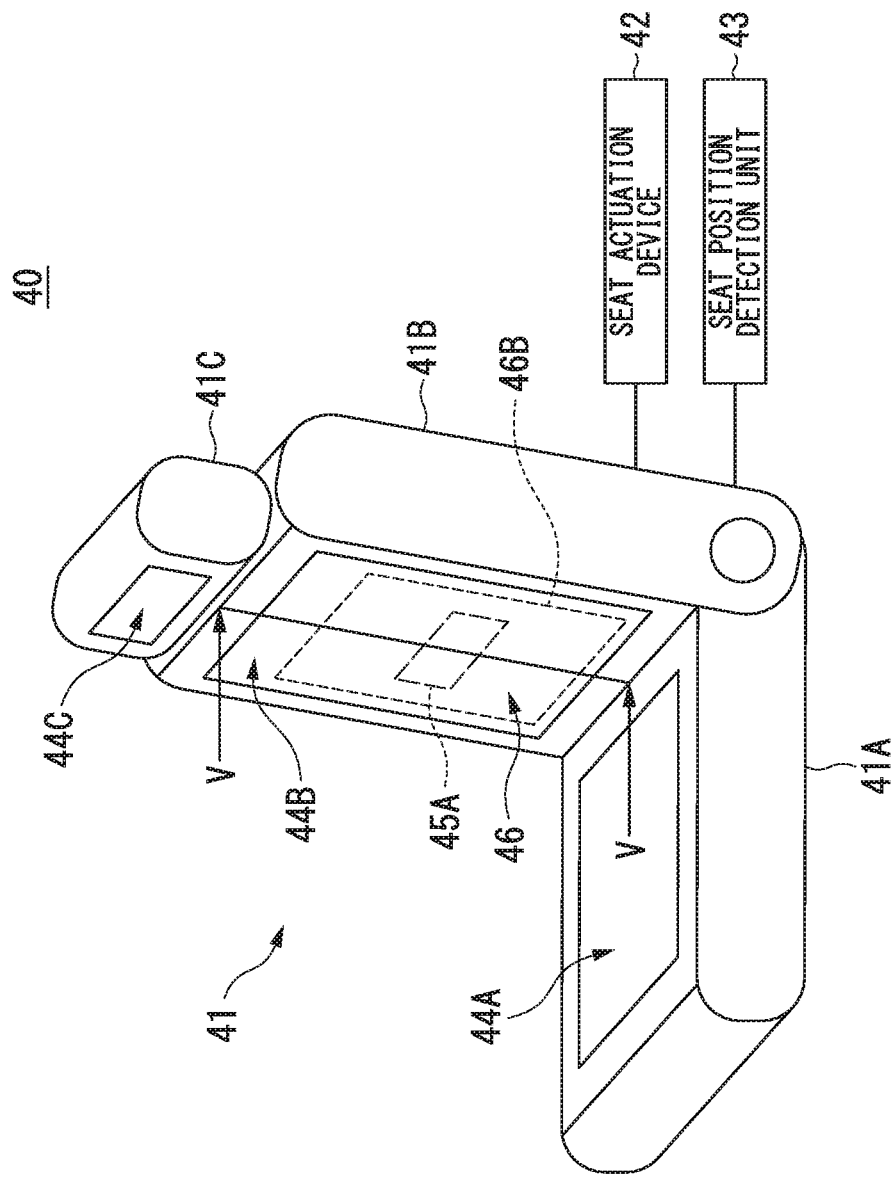
FIG. 4 is a diagram showing a seat device according to a first embodiment.

FIG. 4 is a diagram showing the seat device of the first embodiment. The seat device 40 includes, for example, a seat (seat main body) 41, a seat actuation device 42, and a seat position detection unit 43.

The seat 41 includes, for example, a sitting portion 41A, a backrest portion (a seat back) 41B, and a headrest 41C. The sitting portion 41A is a portion on which an occupant sits. The backrest portion 41B supports the back of the occupant sitting on the sitting portion 41A. The headrest 41C supports the head or neck of the occupant sitting on the sitting portion 41A. For example, an armrest or a footrest may also be provided on the seat 41 of the first embodiment.

The seat actuation device 42 changes the reclining angle, the forward-backward position, the lateral position, the vertical position, or the like of the seat 41 on the basis of an instruction from the seat control unit 160. For example, the seat actuation device 42 controls a motor or the like to move a protruding mechanism provided in at least one of the sitting portion 41A, the backrest portion 41B, and the headrest 41C. The moved protruding mechanism causes at least a part of contact portions between the occupant and the seat 41 to protrude. The contact portions are, for example, portions indicated by regions 44A to 44C shown in FIG. 4.

The seat position detection unit 43 detects the reclining angle of the seat 41, forward-backward, lateral, and vertical displacements of the seat 41 from their reference positions, the yaw angle, and the like thereof. The seat position detection unit 43 detects the position of the protruding mechanism or a displacement thereof from its reference position. The seat position detection unit 43 outputs the detection result to the seat control unit 160.

Next, the operation of protruding mechanisms provided in the seat 41 will be described in detail. Hereinafter, protruding mechanisms provided in the backrest portion 41B will be described as a representative.

Figure 5:
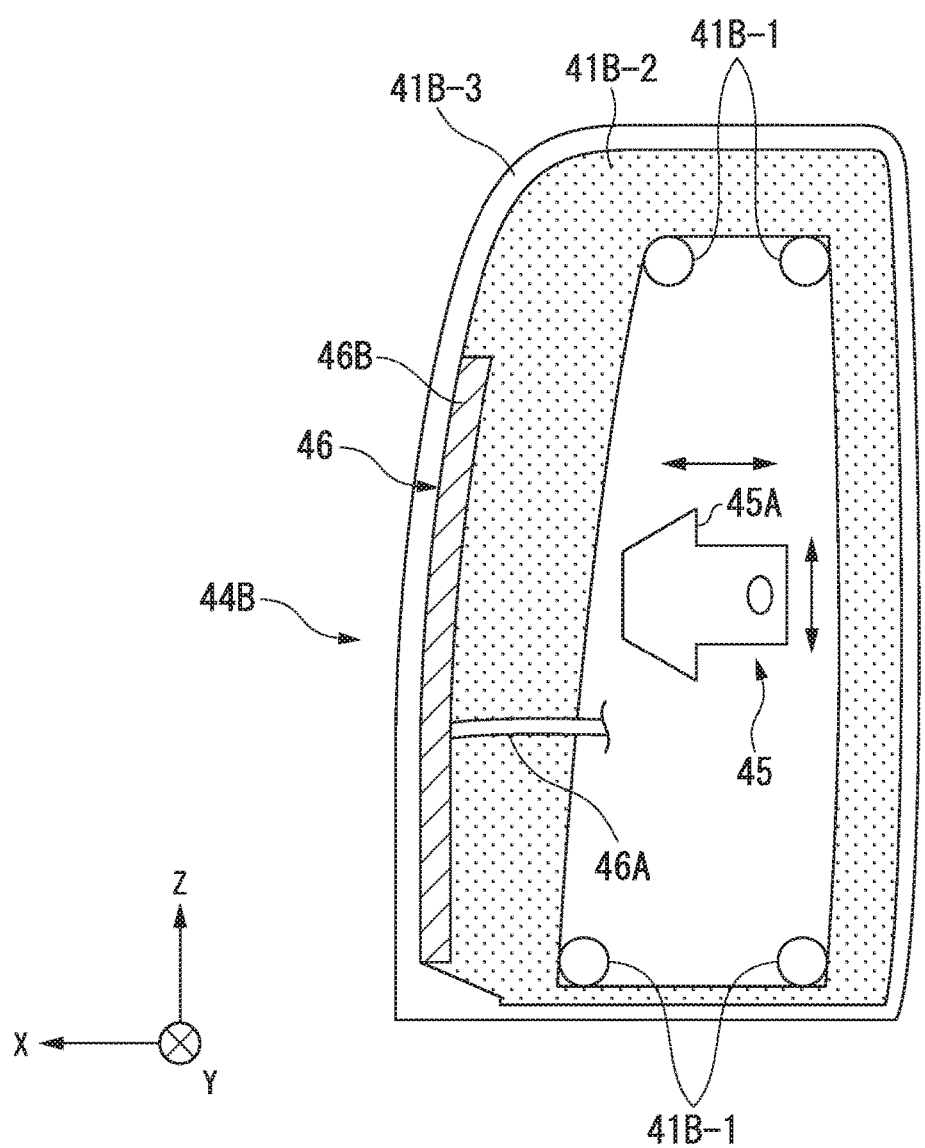
FIG. 5 is a diagram showing a specific example of a protruding mechanism of the first embodiment.

FIG. 5 is a diagram showing a specific example of the protruding mechanism of the first embodiment. FIG. 5 is a cross-sectional view taken along line V-V shown in FIG. 4. The backrest portion 41B includes, for example, a frame member 41B-1, a pad member 41B-2, a cover member 41B-3, a first protruding mechanism 45, and a second protruding mechanism 46.

The frame member 41B-1 is, for example, a member formed of a metal such as aluminum, iron, or alloy. The frame member 41B-1 may be a resin member such as plastic. The frame member 41B-1 is formed, for example, in the shape of a hollow pipe. A pushing member 45A which will be described later, a pump for injecting or discharging a gas or liquid into or from a bag-like member 46B which will be described later, or the like may be mounted in the hollow portion of the frame member 41B-1.

The pad member 41B-2 is a member which covers the periphery of the frame member 41B-1 and supports the posture of the occupant while reducing vibrations during travel of the vehicle M. For example, a material such as sponge, urethane, polyester cotton, or beads is used for the pad member 41B-2.

The cover member 41B-3 is an interior member that covers the periphery of the pad member 41B-2. For example, a material such as cloth, synthetic leather, or genuine leather is used for the cover member 41B-3.

The first protruding mechanism 45 includes, for example, the pushing member 45A provided in an inner space of the frame member 41B-1 of the backrest portion 41B. The pushing member 45A is movable in at least one of the X, Y, and Z directions by the seat actuation device 42. The position of the pushing member 45A is detected by the seat position detection unit 43. For example, by the seat actuation device 42, the first protruding mechanism 45 moves the pushing member 45A forward from the reference position such that the entire region of a contact portion 44B between the occupant and the backrest portion 41B is pushed out from inside. The reference position is, for example, a position at which the pushing member 45A is stored when the vehicle is parked or stopped.

Figure 6:
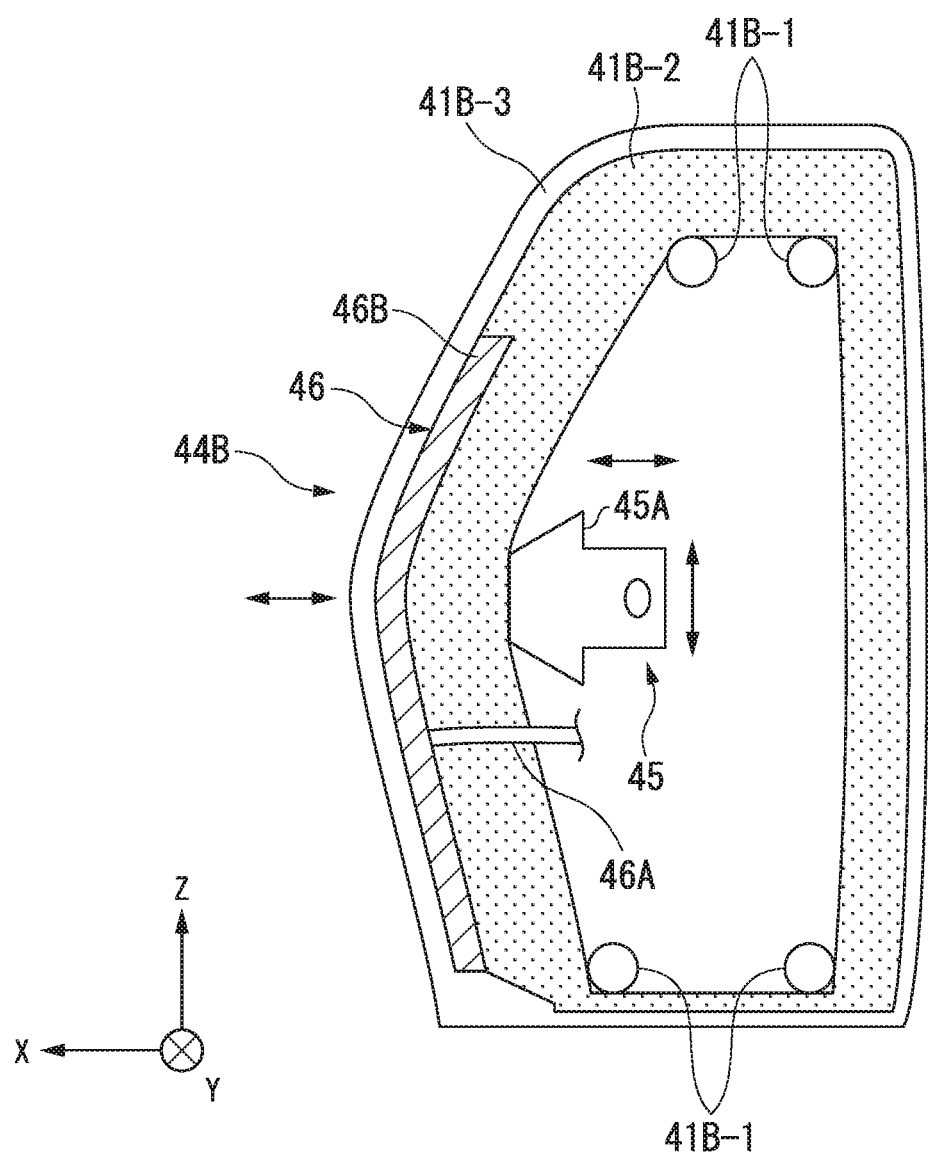
FIG. 6 is a diagram showing a state in which a seat is caused to protrude by a first protruding mechanism.

FIG. 6 is a diagram showing a state in which the seat 41 is caused to protrude by the first protruding mechanism 45. For example, upon receiving from the occupant on the seat 41 an instruction to cause the contact portion between the occupant and the backrest portion 41B to protrude in a case that the driving mode of the vehicle M is manual driving, the seat control unit 160 causes the seat actuation device 42 to adjust the position and displacement of the pushing member 45A such that the backrest portion 41B is pushed out in the X direction. This allows the backrest portion 41B to stably support the back of the occupant sitting on the seat 41 and to press and massage the back of the occupant. The motion of the backrest portion 41B can stretch the back muscle of the occupant, thereby relaxing the occupant.

For example, in a case that the first protruding mechanism 45 is actuated, the seat control unit 160 makes it more difficult for the occupant sitting on the seat 41 to shake than in a case that the second protruding mechanism 46 which will be described later is actuated. Thus, even if the first protruding mechanism 45 is actuated, it is possible not to disturb the driving posture of the occupant.

Figure 7:
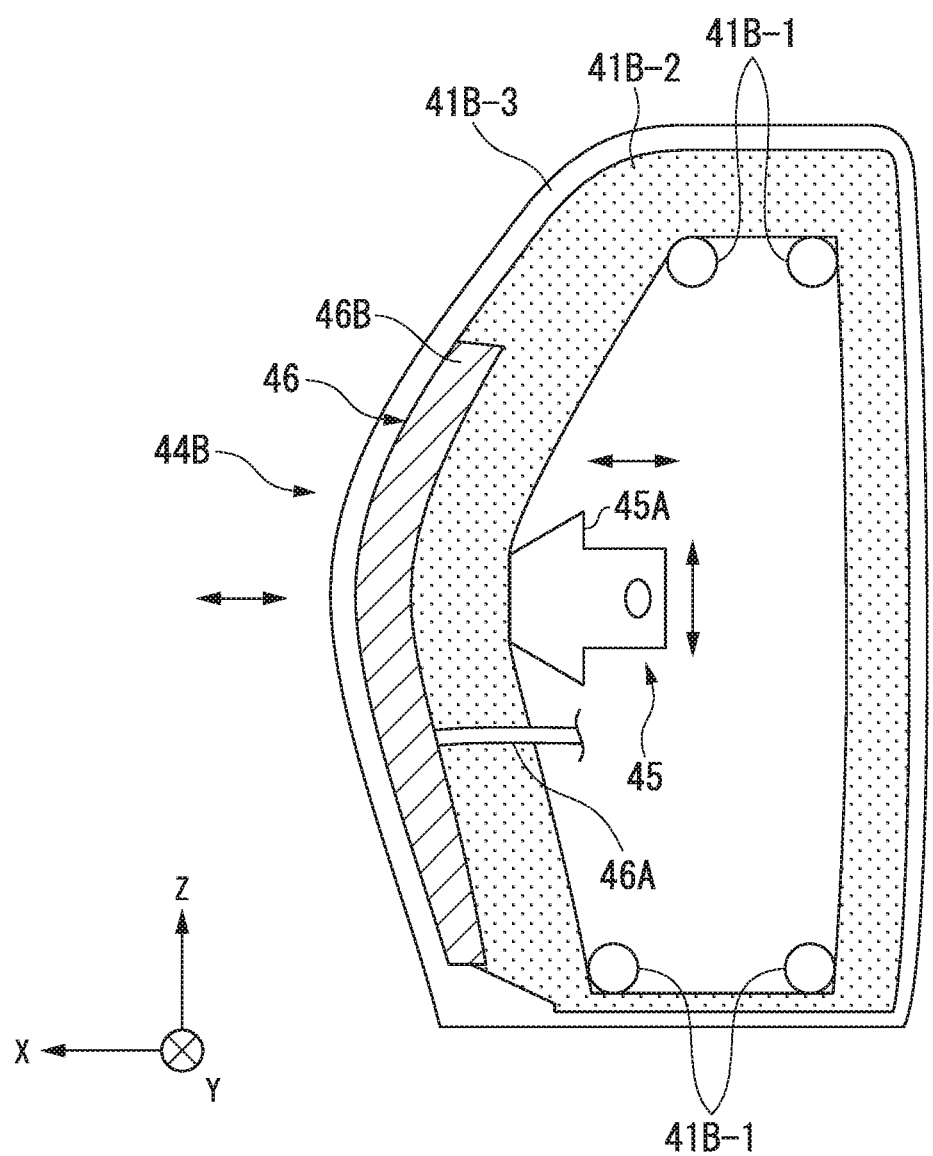
FIG. 7 is a diagram showing a state in which the seat is caused to protrude by actuating a second protruding mechanism.

In a case that the driving mode of the vehicle M is automated driving, the seat control unit 160 controls the second protruding mechanism 46 to cause at least a part of the contact portions between the occupant and the seat 41 to protrude. FIG. 7 is a diagram showing a state in which the seat 41 is caused to protrude by activating the second protruding mechanism 46. For example, in a case that the driving mode of the vehicle M is automated driving such that the occupant does not drive, the seat control unit 160 controls the second protruding mechanism 46 to cause at least a part of the occupant on the backrest portion 41B to protrude. In this case, by the seat actuation device 42, the second protruding mechanism 46 injects gas or liquid into the bag-like member 46B provided between the cover member 41B-3 and the pad member 41B-2 of the backrest portion 41B through an injection discharge pipe 46A. The bag-like member 46B stores gas or liquid and expands within a predetermined range according to the amount of gas or liquid stored. Thus, the second protruding mechanism 46 inflates the bag-like member 46B causing the entirety of the region 44B to protrude. The bag-like member 46B is, for example, a bag-like elastic body or synthetic resin member. The gas is, for example, air. The liquid is, for example, water. The liquid or gas is injected into or discharged from the bag-like member 46B, for example, by a pump connected to the injection discharge pipe 46A. The seat actuation device 42 opens and closes a valve connected to the injection discharge pipe 46A and controls driving of the pump under control of the seat control unit 160.

For example, in a case that the bag-like member 46B is formed of an elastic body such as rubber, the seat actuation device 42 opens the valve such that gas or liquid is injected into the bag-like member 46B by the pump, expanding the bag-like member 46B. With the bag-like member 46B expanded, the seat actuation device 42 closes the valve such that the seat is kept protruding. With the bag-like member 46B expanded, the seat actuation device 42 opens the valve such that gas or liquid is discharged from inside by the elastic force of the bag-like member 46B to return to its original state. This allows the seat actuation device 42 to easily cause the seat 41 to protrude using a gas or liquid and to quickly discharge the gas or liquid. A pump for discharge may be provided in addition to the pump for injection described above.

For example, in a case that the driving mode of the vehicle M switches from manual driving to automated driving, the seat control unit 160 enables protrusion adjustment of the second protruding mechanism 46 while maintaining the protrusion state of the first protruding mechanism 45. Accordingly, in a case that the driving mode switches from automated driving to manual driving, the seat control unit 160 can promptly return the state to that before switching from manual driving to automated driving merely by causing the second protruding mechanism 46 to discharge the stored gas or liquid.

Alternatively, in a case that the driving mode of the vehicle M switches from manual driving to automated driving, the seat control unit 160 may control not only the second protruding mechanism 46 but also the first protruding mechanism 45. By simultaneously actuating both the first and second protruding mechanisms 45 and 46, it is possible to increase the movable range of the entire protruding mechanisms. As a result, it is possible to further improve the massage or relaxation effect on the occupant depending on the operation modes of the first and second protruding mechanisms 45 and 46.

For example, in a case that the driving mode of the vehicle M switches from manual driving to automated driving, the seat control unit 160 may cause at least a part of the contact portions between the occupant and the seat 41 to protrude by the second protruding mechanism 46 after (or while) the first protruding mechanism 45 returns (or is returning) the pushing member 45A to the reference position. Thus, the seat control unit 160 can increase the displacement between the maximum protrusion and the maximum depression of the seat 41 using a gas or liquid and therefore it is possible to further reduce the load on the occupant and to further improve the massage effect on the occupant.

[Process Flow]

Figure 8:
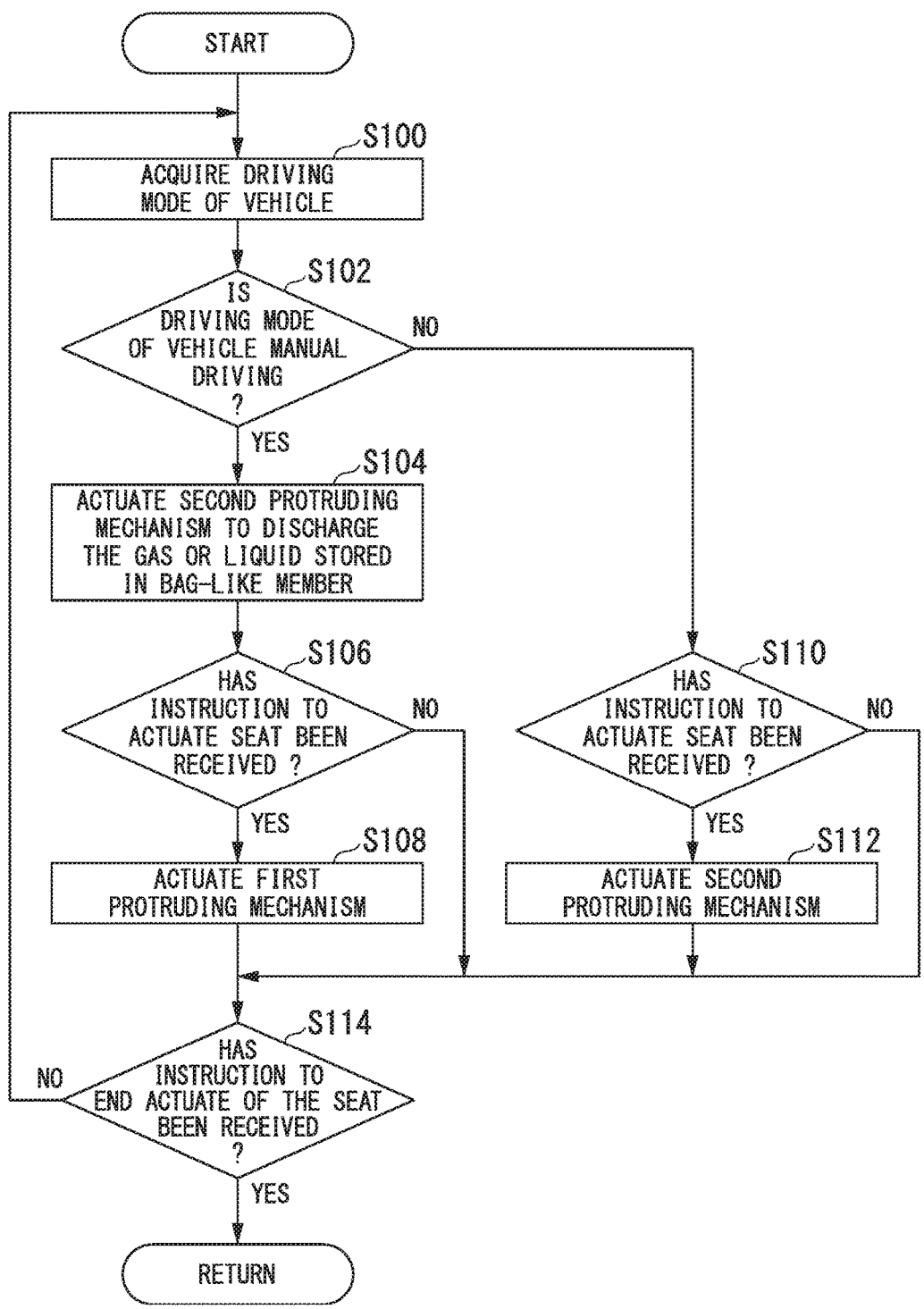
FIG. 8 is a flowchart showing a flow of seat control of a seat device.

A flow of seat control of the seat device 40 will hereinafter be described. FIG. 8 is a flowchart showing the flow of seat control of the seat device 40. In an example of FIG. 8, the seat control unit 160 acquires the driving mode of the vehicle M (step S100) and determines whether or not the driving mode of the vehicle M is manual driving (step S102). Upon determining that the driving mode of the vehicle M is manual driving, the seat actuation device 42 actuates the second protruding mechanism 46 to discharge the gas or liquid stored in the bag-like member 46B (step S104).

Next, the seat control unit 160 determines whether or not an instruction to actuate the seat 41 has been received (step S106). An instruction to actuate the seat 41 may be received from the HMI 30 which is operated by the occupant or may be received from the switching control unit 142. Upon determining in step S106 that an instruction to actuate the seat 41 has been received, the seat actuation device 42 actuates the first protruding mechanism 45 to cause the seat 41 to protrude (step S108).

If it is determined in step S102 that the driving mode of the vehicle M is not manual driving, the driving mode of the vehicle M is automated driving. In this case, the seat control unit 160 determines whether or not an instruction to actuate the seat 41 has been received (step S110). Upon determining in step S110 that an instruction to actuate the seat 41 has been received, the seat actuation device 42 actuates the second protruding mechanism 46 to cause the seat 41 to protrude (step S112).

Next, the seat control unit 160 determines whether or not an instruction to end the actuation of the seat 41 of the first embodiment has been received from the HMI 30 or the behavior plan generation unit 123 (step S114). Upon determining that an instruction to end the actuation of the seat 41 of the first embodiment has not been received, the seat control unit 160 returns to the process of step S100. Upon determining that an instruction to end the actuation of the seat 41 of the first embodiment has been received, the seat control unit 160 ends the process of this flowchart.

According to the first embodiment described above, by actuating the first and second protruding mechanisms 45 and 46, it is possible to realize seat forms more suitable for changes in the driving mode. As a result, the vehicle control system not only can relax the occupant but can also suitably reduce the occupant's fatigue or suitably achieve recovery from fatigue.

Second Embodiment

Figure 9:
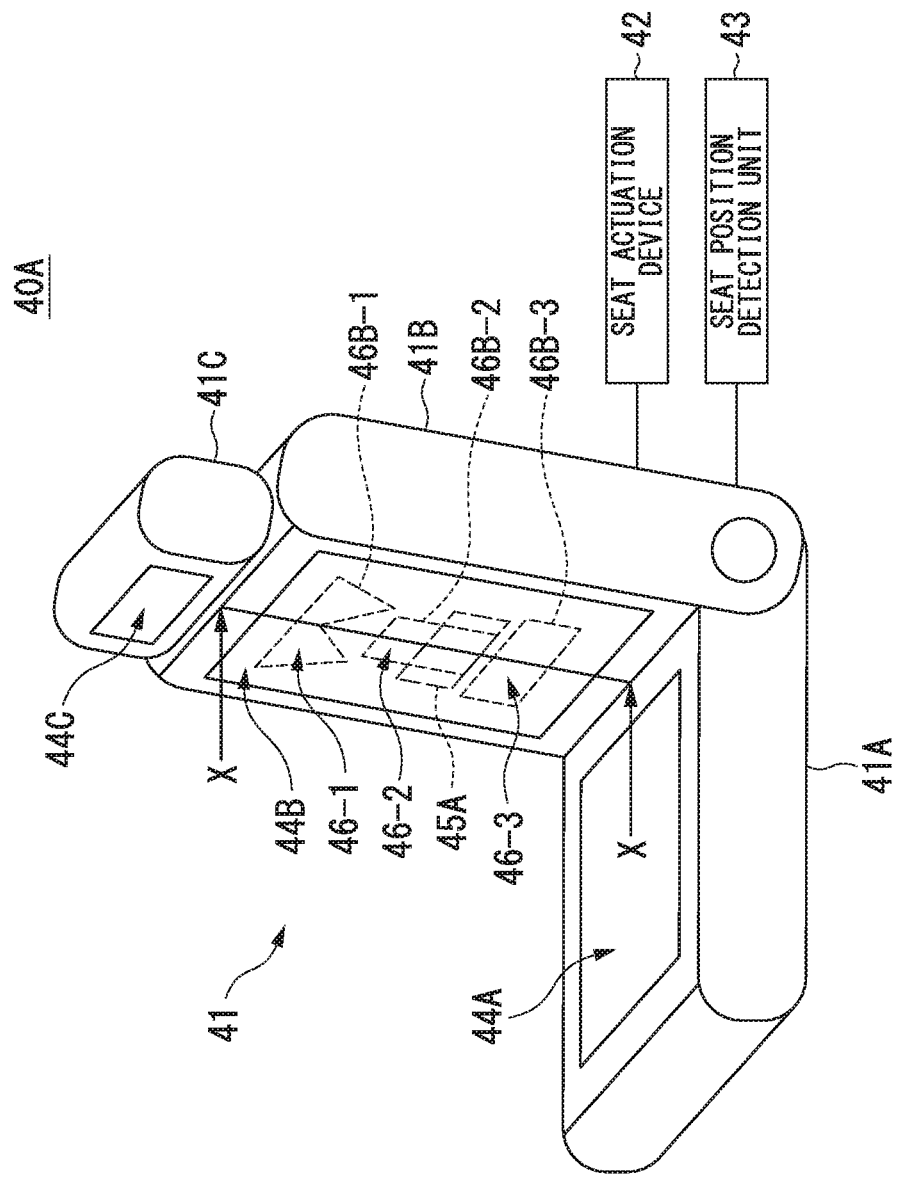
FIG. 9 is a diagram showing a seat device according to a second embodiment.

Next, a specific example of a seat device according to a second embodiment will be described. FIG. 9 is a diagram showing the seat device according to the second embodiment. In the description of the second embodiment, the same elements as those of the first embodiment described above are denoted by the same reference signs and detailed descriptions thereof are omitted. The seat device 40 according to the first embodiment has one second protruding mechanism 46, whereas the seat device 40A of the second embodiment has a plurality of second protruding mechanisms 46-1 to 46-3 such that it is possible to partially press the seated occupant according to each part of the occupant. The number of second protruding mechanisms in the second embodiment is not limited to three and may be any number of two or more.

Figure 10:
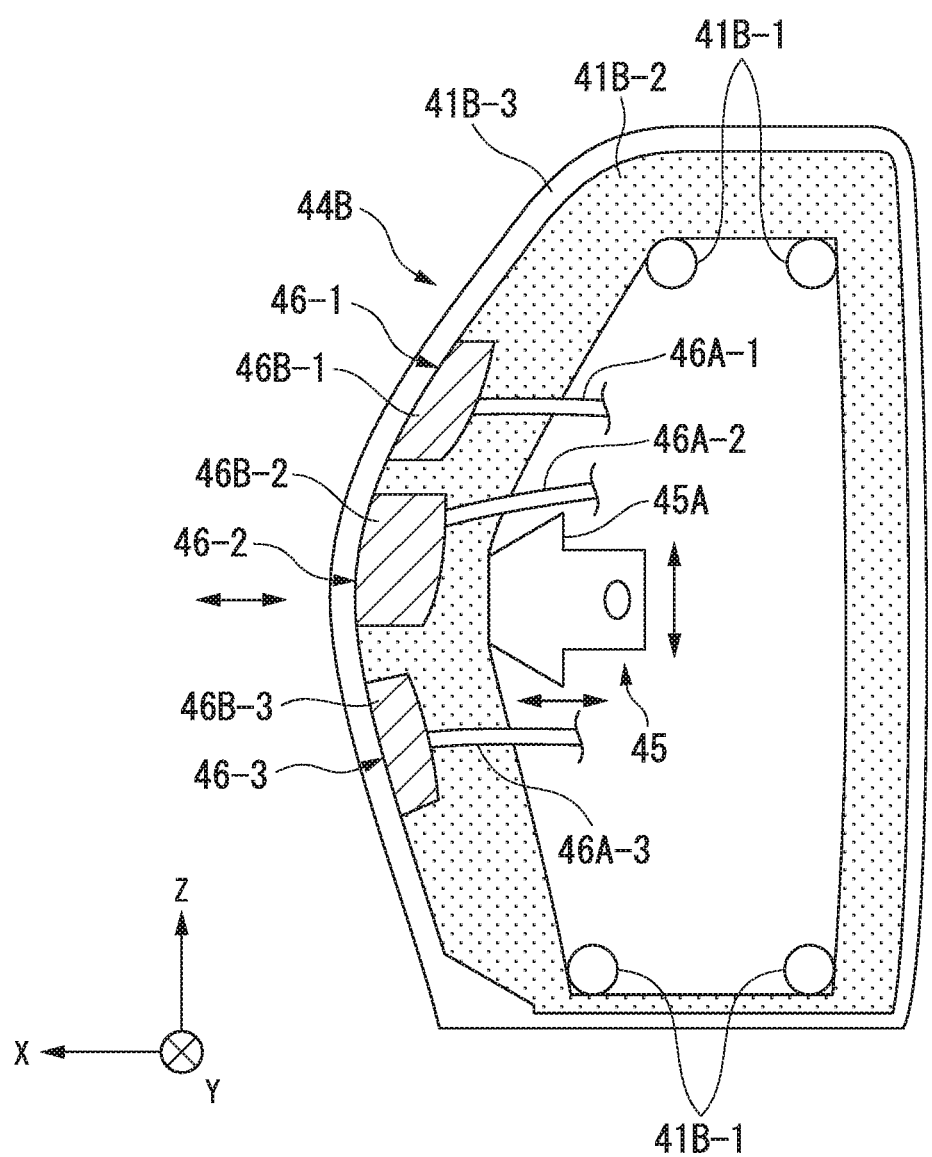
FIG. 10 is a diagram showing a specific example of a protruding mechanism of the second embodiment.

FIG. 10 is a diagram showing a specific example of the protruding mechanism according to the second embodiment. FIG. 10 is a cross-sectional view taken along line X-X shown in FIG. 9. The three second protruding mechanisms 46-1 to 46-3 have their associated injection discharge pipes 46A-1 to 46A-3 and their associated bag-like members 46B-1 to 46B-3. The sizes and shapes of the bag-like members 46B-1 to 46B-3 may differ, for example, according to the occupant's body parts facing the bag-like members 46B-1 to 46B-3. The bag-like member 46B-1 has a shape that facilitates massage of the vicinities of the left and right shoulder blades of the occupant sitting on the seat device 40A. The bag-like member 46B-2 has a shape that facilitates massage of the vicinity of the backbone of the occupant sitting on the seat device 40A. The bag-like member 46B-3 has a shape that facilitates massage of the vicinity of the waist of the occupant sitting on the seat device 40A. By making the bag-like members 46B-1 to 46B-3 into shapes that are easy to massage the occupant's parts facing the bag-like members 46B-1 to 46B-3 in this way, it is possible to improve the massage effect of the second protruding mechanism 46 on each part of the occupant. By making the bag-like members 46B-1 to 46B-3 into shapes that are easy to support the occupant's parts according to the shapes or sizes of the parts, it is possible to reduce the occupant's fatigue due to seating.

For example, upon determining that the driving mode of the vehicle M has switched from manual driving to automated driving or upon determining that an instruction to cause the contact portion between the occupant and the backrest portion 41B to protrude has been received from the occupant on the seat 41 during automated driving, the seat control unit 160 injects gas or liquid into a bag-like member of at least one of the second protruding mechanisms 46-1 to 46-3 to inflate the bag-like member. In this case, the seat control unit 160 may inject different amounts of gas or liquid into the installed bag-like members 46B-1 to 46B-3. The seat control unit 160 may also allow the bag-like members 46B-1 to 46B-3 to discharge different amounts of gas or liquid. In this case, the seat control unit 160 controls the amounts of injection or discharge, for example, based on opening times of the valve.

The seat control unit 160 may also individually adjust the injection speeds of gas or liquid into the bag-like members 46B-1 to 46B-3 and the discharge speeds of gas or liquid from the bag-like members 46B-1 to 46B-3. In this case, the seat control unit 160 controls the injection speeds or the discharge speeds, for example, on the basis of the opening degrees of the valves. By allowing the seat control unit 160 to adjust at least one of the amount of injection, the amount of discharge, the injection speed, and the discharge speed of gas or liquid of each of the bag-like members 46B-1 to 46B-3, it is possible to locally press the occupant's body parts in various pressing patterns. Therefore, it is possible to improve the massage or relaxation effect on the occupant.

The seat control unit 160 may periodically control injection or discharge of gas or liquid into or from the bag-like members 46B-1 to 46B-3. The seat control unit 160 may perform control such that gas or liquid is synchronously or asynchronously injected into or discharged from the bag-like members 46B-1 to 46B-3.

According to the second embodiment described above, in addition to the same effects as those of the first embodiment, it is possible to more flexibly adjust modes of causing the seat 41 to protrude and therefore it is possible to further improve the massage or relaxation effect.

[Modification]

In the embodiments described above, the seat 41 is caused to protrude by the first and second protruding mechanisms 45 and 46 to perform massage or the like on the occupant. However, the first and second protruding mechanisms 45 and 46 may be actuated for purposes other than massage. For example, in a case that a movie or the like is being displayed on the display device of the HMI 30 or in a case that a game or the like is being executed, the seat control unit 160 may actuate at least one of the first protruding mechanism 45 or the second protruding mechanism 46 on the basis of a predetermined scene, staging content, voice, or operation content. Thus, the seat control unit 160 can provide the occupant with a realistic entertainment, for example, by moving the seat 41 according to a moving scene in a movie or the like. Therefore, the vehicle system 1 of the embodiments can create a diversion for the occupant, improve the relaxation effect, and achieve recovery from fatigue due to driving. Each of the first and second embodiments and the modification described above may be partially or wholly combined with any of the other embodiment or modification.

Although the modes for carrying out the present invention have been described above by way of embodiments, the present invention is not limited to these embodiments at all and various modifications and substitutions can be made without departing from the gist of the present invention.

What is claimed is:

1. A vehicle control system comprising:
   a seat on which an occupant of a vehicle sits;
   a first protruding mechanism configured to move a pushing member provided inside the seat to adjust a protruding position and a displacement of the seat;
   a second protruding mechanism configured to inject a gas or liquid into a bag-like member provided inside the seat to adjust the protruding position and the displacement of the seat; and
   a seat control unit configured to control the first protruding mechanism to cause at least a part of a contact portion between the occupant and the seat to protrude in a case that the vehicle performs a first driving mode having a degree of automated driving less than a predetermined reference and to control the second protruding mechanism to cause at least a part of the contact portion between the occupant and the seat to protrude in a case that the vehicle performs a second driving mode having a degree of automated driving equal to or higher than the predetermined reference.

2. The vehicle control system according to claim 1, wherein, in a case that the first protruding mechanism is actuated, the seat control unit is configured to make it more difficult for the occupant sitting on the seat to shake than in a case that the second protruding mechanism is actuated.

3. The vehicle control system according to claim 1, wherein, in a case that the vehicle switches from the second driving mode to the first driving mode, the seat control unit is configured to control the second protruding mechanism such that the bag-like member discharges the gas or liquid and to control the first protruding mechanism such that the first protruding mechanism supports a posture of the occupant.

4. The vehicle control system according to claim 1, wherein the bag-like member is formed of an elastic body and expands when the gas or liquid is injected and discharges the gas or liquid by an elastic force of returning to an original shape.

5. The vehicle control system according to claim 1, wherein the seat control unit is configured to control the first protruding mechanism such that the first protruding mechanism moves the pushing member to a reference position in a case that the vehicle switches from the first driving mode to the second driving mode and then to control the second protruding mechanism to cause at least a part of the contact portion between the occupant and the seat to protrude.

6. The vehicle control system according to claim 1, wherein a plurality of bag-like members for storing the gas or liquid are provided inside the seat, and
   the seat control unit is configured to control the second protruding mechanism such that the gas or liquid is injected into one of the plurality of bag-like members associated with a part of the occupant which is in contact with the seat.

7. The vehicle control system according to claim 6, wherein the seat control unit is configured to control the second protruding mechanism such that the second protruding mechanism adjusts at least one of an amount of injection, an amount of discharge, an injection speed, or a discharge speed of the gas or liquid of each of the plurality of bag-like members.

8. A vehicle control method using an in-vehicle computer, comprising:
   controlling a first protruding mechanism configured to move a pushing member provided in a seat on which an occupant of a vehicle sits to adjust a protruding position and a displacement of the seat in a case that the vehicle performs a first driving mode having a degree of automated driving less than a predetermined reference; and
   controlling a second protruding mechanism configured to inject a gas or liquid into a bag-like member provided in the seat to adjust the protruding position and the displacement of the seat in a case that the vehicle performs a second driving mode having a degree of automated driving equal to or higher than the predetermined reference.

9. A non-transitory computer-readable recording medium recording a vehicle control program causing an in-vehicle computer to:
   control a first protruding mechanism configured to move a pushing member provided in a seat on which an occupant of a vehicle sits to adjust a protruding position and a displacement of the seat in a case that the vehicle performs a first driving mode having a degree of automated driving less than a predetermined reference; and
   control a second protruding mechanism configured to inject a gas or liquid into a bag-like member provided in the seat to adjust the protruding position and the displacement of the seat in a case that the vehicle performs a second driving mode having a degree of automated driving equal to or higher than the predetermined reference.

* * * * *